United States Patent
Dahlén

(10) Patent No.: US 8,977,384 B2
(45) Date of Patent: Mar. 10, 2015

(54) METHOD FOR CRANE CONTROL AND STOCK MANAGEMENT

(75) Inventor: Justus Dahlén, Espoo (FI)

(73) Assignee: Konecranes PLC, Hyvinkaa (FI)

( * ) Notice: Subject to any disclaimer, the term of this patent is extended or adjusted under 35 U.S.C. 154(b) by 56 days.

(21) Appl. No.: 13/642,087

(22) PCT Filed: Apr. 19, 2011

(86) PCT No.: PCT/FI2011/050352
§ 371 (c)(1),
(2), (4) Date: Oct. 18, 2012

(87) PCT Pub. No.: WO2011/131836
PCT Pub. Date: Oct. 27, 2011

(65) Prior Publication Data
US 2013/0041500 A1 Feb. 14, 2013

(30) Foreign Application Priority Data
Apr. 22, 2010 (FI) ..................................... 20105436

(51) Int. Cl.
*G06F 7/00* (2006.01)
*G06Q 10/08* (2012.01)
*B66C 13/48* (2006.01)
*G06Q 50/28* (2012.01)

(52) U.S. Cl.
CPC ................ *G06Q 10/08* (2013.01); *B66C 13/48* (2013.01); *G06Q 10/087* (2013.01); *G06Q 50/28* (2013.01)
USPC ........ 700/223; 700/302; 700/214; 340/10.33; 340/572.1; 382/104

(58) Field of Classification Search
USPC .......................................................... 700/215
See application file for complete search history.

(56) References Cited

U.S. PATENT DOCUMENTS 4,796,209 A * 1/1989 Burk .............................. 700/302
5,565,858 A * 10/1996 Guthrie ....................... 340/10.33
6,076,023 A * 6/2000 Sato ............................... 700/214
(Continued)

FOREIGN PATENT DOCUMENTS

FI 956110 A 6/1997
JP 2000-85975 A 3/2000
(Continued)

*Primary Examiner* — Gene Crawford
*Assistant Examiner* — Kyle Logan
(74) *Attorney, Agent, or Firm* — Birch, Stewart, Kolasch & Birch, LLP

(57) ABSTRACT

The invention relates to a method for crane control and stock management, the method includes attaching to the goods to be stored an identifier associated with a code, such as number or name, given to the goods in stock accounting or the like; reading the identifier with a reader, when the goods are being transferred by a crane; transmitting the identifier information from the reader to the memory of the crane control; transferring the goods with the crane to a selected location in the warehouse; and storing the coordinates of the goods to the memory of the crane control so that they are associated with the identifier; and when the goods are removed from the warehouse, reading with the reader from a work order or the like the identifier information associated with the goods; and transmitting the identifier information from the reader to the memory of the crane control; and activating the crane control with the identifier information, whereby the crane moves to the location of the earlier stored goods.

5 Claims, 2 Drawing Sheets

(56) References Cited

U.S. PATENT DOCUMENTS

| | | | |
|---|---|---|---|
| 7,116,230 B2 * | 10/2006 | Klowak | 340/572.1 |
| 7,344,037 B1 | 3/2008 | Zakula, Sr. et al. | |
| 2002/0014964 A1 | 2/2002 | Okamura | |
| 2006/0210115 A1 * | 9/2006 | Nemet | 382/104 |
| 2007/0282482 A1 | 12/2007 | Beucher et al. | |
| 2008/0252417 A1 | 10/2008 | Thomas et al. | |
| 2011/0062104 A1 * | 3/2011 | Schneider et al. | 212/276 |

FOREIGN PATENT DOCUMENTS

| | | |
|---|---|---|
| JP | 2003-72921 A | 3/2003 |
| JP | 2005-83984 A | 3/2005 |
| JP | 2007-230717 A | 9/2007 |

* cited by examiner

METHOD FOR CRANE CONTROL AND STOCK MANAGEMENT

BACKGROUND OF THE INVENTION

The invention relates to a method for crane control and stock management, in which method goods arriving for storage at a warehouse are transferred by a crane to a given location in the warehouse and fetched later with the crane from this location for onward transfer.

In many places, heavy burdens are transferred in a given storage area mainly by crane. On the other hand, stock accounting is used for goods to indicate what the stock or storage area contains and possibly some location information to facilitate the finding of the goods (usually manually entered information). When the goods are to be transferred on (for instance to a processing line or truck), a work order is made, that is, a paper with identifier information of the goods and information on the action to be taken. Often as much time is used in finding or locating the correct goods as in transferring them.

SUMMARY OF THE INVENTION

The object of the invention is to solve the problems described above. This object is achieved by a method of the invention that is characterised by attaching to the goods to be stored an identifier associated with a code, such as number or name, given to the goods in stock accounting or the like; reading the identifier with a reader, when the goods are being transferred by a crane; transmitting the identifier information from the reader to the memory of the crane control; transferring the goods with the crane to a selected location in the warehouse; and storing the coordinates of the goods to the memory of the crane control so that they are associated with the identifier; and when the goods are removed from the warehouse, reading with the reader from a work order or the like the identifier information associated with the goods; and transmitting the identifier from the reader to the memory of the crane control; and activating the crane control with the identifier information, whereby the crane moves to the location of the earlier stored goods.

Thus, the invention is based on an identifier attached to goods to be stored, for instance a bar code sticker, the data of which is stored in the memory of the crane control, and on the location coordinates of the goods furnished with the identifier, which when the goods are stored are also stored in the memory of the crane control, whereby when fetching the goods from the warehouse, the crane can be controlled automatically to the correct goods by means of this information.

The memory of the crane is, thus, used to store the goods and their location information, whereby, when the goods are fetched, there is no need to have a separate connection to stock accounting but just the identifier information sent by the reader from the work order to the crane is enough.

This new method combines earlier separate work phases while improving them at the same time. Earlier, all these—goods handling and finding and stock accounting—were separate work phases. Combining them also reduces the possibility of recording the goods wrong in the stock systems or transferring the wrong goods, for instance.

When using the present invention, time is no longer wasted in locating the goods; the crane can take the shortest route to the goods; the correct goods are always picked up, so no expensive mistakes are made due to entering wrong goods into the process; synergy gains are obtained between restricted areas and destination areas, whereby accidents and machine malfunctions are avoided; changes and the related costs to current systems are minimal. The above are immediately obtainable benefits.

Benefits obtained over a longer period of time include reduced dependency on individually trained personnel, more exact goods deliveries, and a better base for additional automation.

LIST OF FIGURES

The invention will now be described in more detail by means of a preferred embodiment and with reference to the attached drawings, in which FIG. 1 shows the arrival of goods at a warehouse;

DETAILED DESCRIPTION OF THE INVENTION

FIGS. 1 to 5 of the drawings depict a method for crane 1 control and stock 8 management, in which method goods 2 arriving at the warehouse 8 for storage are transferred by a crane 1 to a given location in the warehouse 8 and fetched later with the crane 1 from this location for onward transfer. By way of example, a steel sheet roll is used as the goods 2 being stored.

Figure 1:
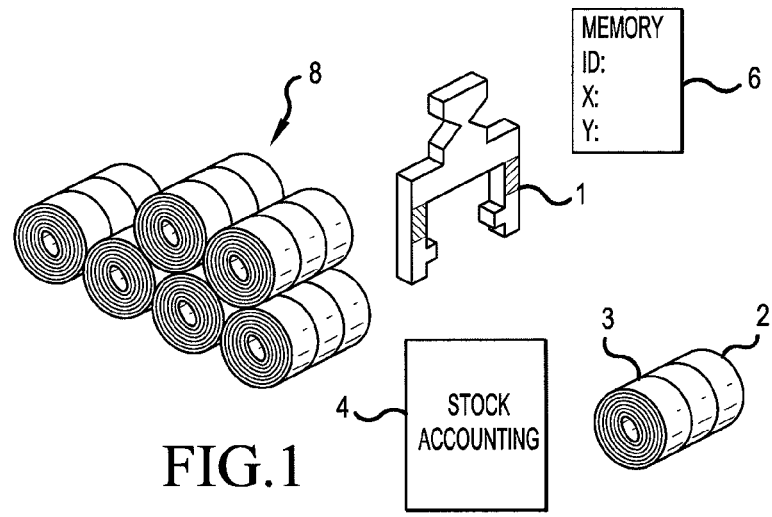

As shown in FIG. 1, the goods 2 arriving for storage are first furnished with an attachable identifier 3 that is associated with a code, such as number or name, given to the goods 2 in stock accounting 4 or the like.

Figure 2:
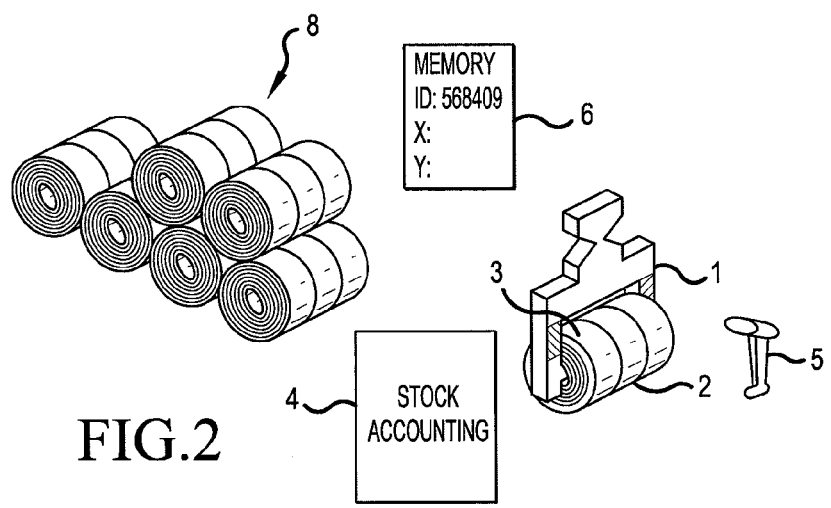
FIG. 2 shows identifying the goods before transfer to the warehouse.

Then, as shown in FIG. 2, the identifier 3 is read by a reader 5, when the goods 2 are transferred by the crane 1, and the identifier information is transmitted from the reader 5 to the memory 6 of the crane 1 control.

Figure 3:
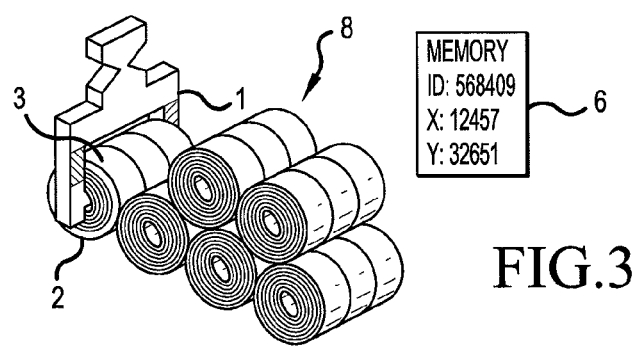
FIG. 3 shows transferring the goods to the warehouse.

After this, as shown in FIG. 3, the goods 2 are transferred by the crane 1 to a selected place in the warehouse 8 and the coordinates of the goods 2 are stored into the memory 6 of the crane 1 control so that they are associated with said identifier 3.

The coordinates of the goods 2 may be stored into the memory 6 of the crane 1 control in the following ways, for example:

a) storing the coordinates of the goods 2 into the memory 6 of the crane 1 control when the crane 1 determines on the basis of the end of load of its hoisting member that the goods 2 have been left at the selected place (measured load diminishes to zero or nearly to zero);

b) storing the coordinates of the goods 2 into the memory 6 of the crane 1 control in such a manner that the operator of the crane 1 acknowledges the goods 2 as left in the selected place by separately pressing an appropriate button, for example;

c) storing the coordinates of the goods 2 into the memory 6 of the crane 1 control, when the hoisting member of the crane 1 detects by means of a mechanical switch (e.g. a switch that measures compression in a gripper-like hoisting member) or sensor (e.g. a sensor that measures negative pressure in a suction pad hoisting member) that the goods 2 have been left in the selected place.

Figure 4:
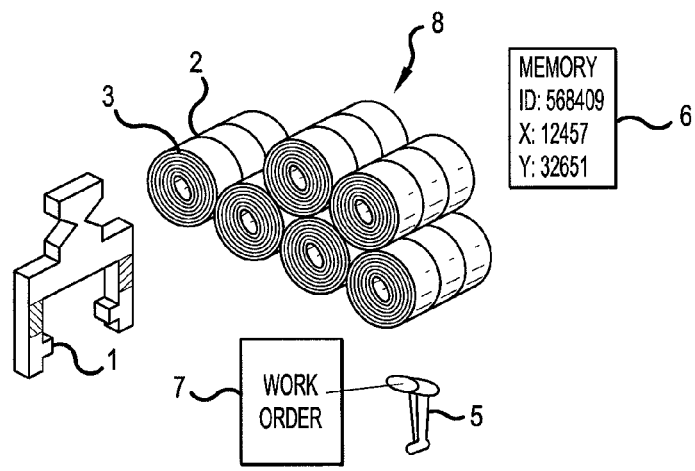
FIG. 4 shows preparing to fetch the goods from the warehouse.
Figure 5:
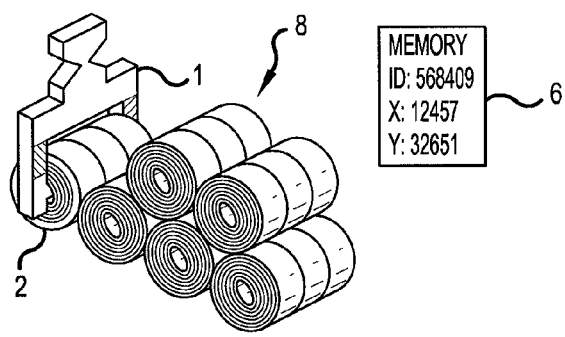
FIG. 5 shows fetching the goods from the warehouse.

When later, as shown by FIG. 4, said stored goods 2 are fetched from the warehouse 8 for further delivery, the reader 5 reads from a work order 7 or the like the identifier information associated with the goods 2, and the identifier information is transmitted from the reader 5 to the memory 6 of the crane 1 control, and the crane 1 control is activated with said identifier information, whereby the crane 1 moves, as shown in FIG. 5, to the location of the earlier stored goods 2, for instance in such a manner that the crane control is kept activated by continuing to press an activation button (not shown in the figures) associated with said function of the crane 1 control.

The identifier 3 attached to the goods can preferably be a 2D bar code sticker, for instance, in which case a corresponding 2D bar code reader is suitable as the reader 5.

Even though a steel sheet roll is herein shown as the goods 2 to be stored, when applying the invention, the goods to be stored may be any goods suitable for this type of automated storing.

The above description of the invention is only intended to illustrate the basic idea of the invention. A person skilled in the art may, however, implement the basic idea of the invention in many ways. The invention and its embodiments are thus not restricted to the example described above, but may vary within the scope of the attached claims.

The invention claimed is:

1. A method for crane control and stock management, in which method the goods arriving for storage at a warehouse are transferred by a crane to a given location in the warehouse and fetched later with the crane from this location for onward transfer, the method comprising:
    attaching an identifier associated with a code to the goods arriving for storage;
    reading the identifier with a reader; transmitting the identifier information from the reader to a memory of the crane control;
    transferring the goods with the crane to a selected place in the warehouse and storing the coordinates of the goods into the memory of the crane control so that they are associated with said identifier;
    determining the coordinates of the selected place of goods by a switch or sensor detecting that the goods have been left in the selected place;
    when fetching said stored goods, reading the identifier information associated with the goods;
    transmitting the identifier information from the reader to the memory of the crane control; and
    activating the crane control with said identifier information, whereby the crane moves to the location of the earlier stored goods, wherein determining the coordinates of the selected place is determined with a sensor detecting pressure in a suction pad,
    wherein determining the coordinates of the selected place is determined with a sensor detecting pressure in a suction pad.

2. A method as claimed in claim 1, wherein, when the stored goods are fetched, the crane control is kept activated by continuing to press an activation button associated with said function of the crane control.

3. A method as claimed in claim 1, wherein the identifier is a bar code sticker.

4. A method as claimed in claim 1, wherein the reader is a 2D bar code reader.

5. The method as claimed in claim 1, wherein determining the coordinates of the selected place is determined with a switch detecting compression in a hoisting member.

* * * * *